United States Patent [19]

Unno

[11] Patent Number: 5,748,302
[45] Date of Patent: May 5, 1998

[54] OPTICAL POWER METER

[75] Inventor: Yasushi Unno, Tokyo, Japan

[73] Assignee: Ando Electric Co., Ltd., Tokyo, Japan

[21] Appl. No.: 799,461

[22] Filed: Feb. 13, 1997

[30] Foreign Application Priority Data

Feb. 22, 1996 [JP] Japan ................................. 8-035279

[51] Int. Cl.⁶ ..................................................... G01J 1/44
[52] U.S. Cl. ................................... 356/224; 250/214 AG; 356/226
[58] Field of Search .................................. 356/224, 226; 250/214 AG

[56] References Cited

U.S. PATENT DOCUMENTS 4,673,807   6/1987   Kobayashi et al. ............... 250/214 AG

FOREIGN PATENT DOCUMENTS 7-174666   7/1995   Japan .

Primary Examiner—Richard A. Rosenberger
Attorney, Agent, or Firm—Finnegan, Henderson, Farabow, Garrett & Dunner, L.L.P.

[57] ABSTRACT

An optical power meter which is capable of performing power range switchover operations in short periods of time and are capable of performing optical power measurements over a wide range in short periods of time. The invention comprises a photodiode 101 which outputs an electrical current proportional to the input optical power, an I/V amp 102 which converts this electrical current into voltage, a variable-gain amp 103 for amplifying this voltage, an A/D converter 107 which converts the output voltage from this variable-gain amp into a digital signal, a CPU 110 which processes the digital signal outputted from this A/D converter 107, and saturation detecting comparators 108 and 109 which detect saturation of the I/V amp and the variable-gain amp. The CPU 110 switches the gains of the I/V amp and the variable-gain amp based on the output signals from the saturation detecting comparators.

3 Claims, 6 Drawing Sheets

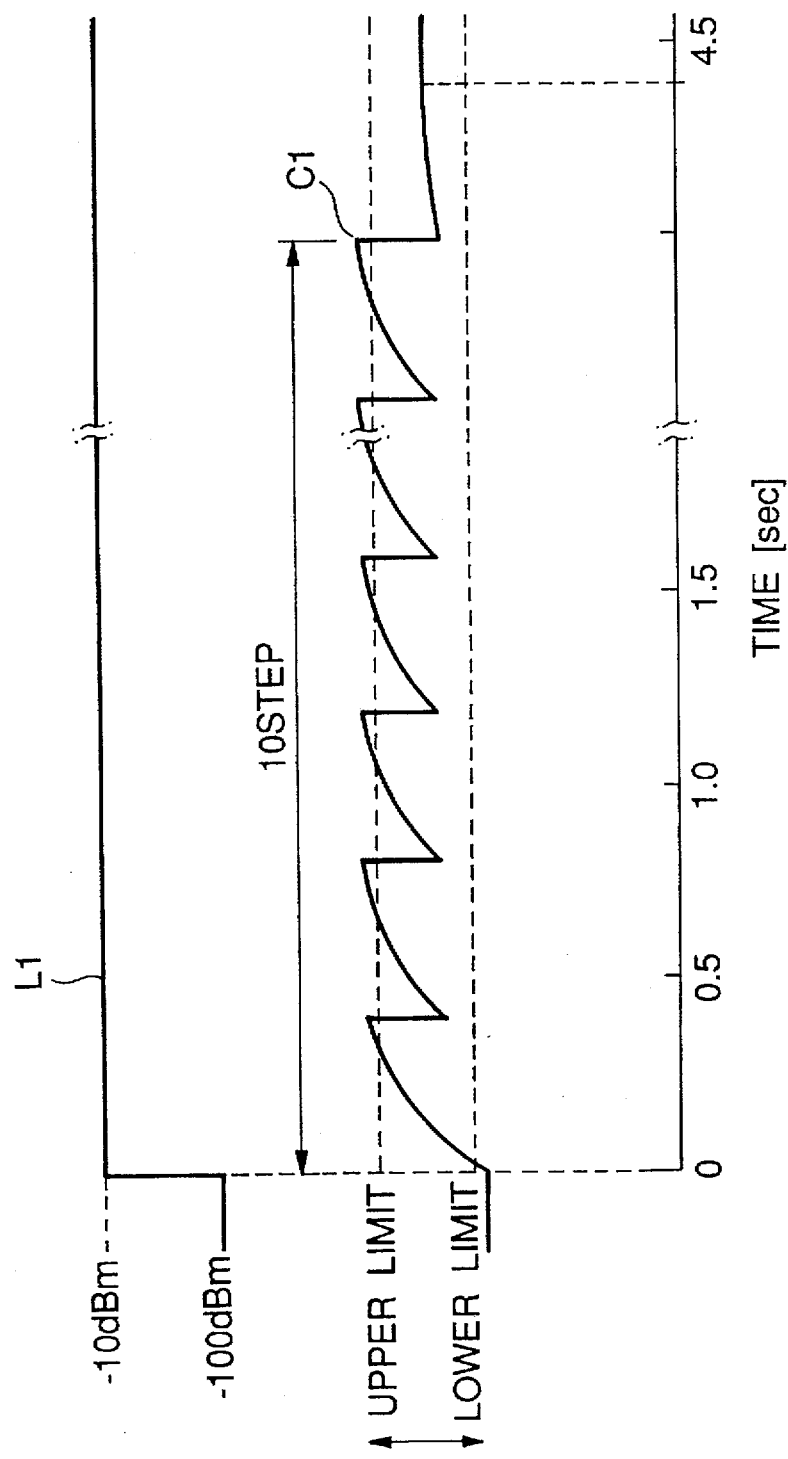

OPTICAL POWER METER

BACKGROUND OF THE INVENTION

1. Technical Field of the Invention

The present invention relates to optical power meters, especially to optical power meters having power range switchover capabilities.

2. Background Art

Generally, optical power meters comprise a photodiode which outputs an electrical current proportional to the optical power of an input optical beam, an I/V amp which converts the output current of this photodiode to a voltage, a variable-gain amp which amplifies the output voltage of this I/V amp, and an A/D converter which converts the output voltage of this variable gain amp to a digital signal. In this case, the input voltages capable of being handled by the A/D converter are restricted to within a constant allowable range, so that the input voltage supplied through the variable-gain amp must be switched over to a power range within this allowable range. Conventionally, the power range is switched over by changing the gains of the I/V amp and the variable-gain amp.

FIG. 5 is a block diagram showing an example of the structure of a conventional optical power meter having this type of power range switchover capability. As shown in FIG. 5, the conventional optical power meter is composed of a photodiode 301, an I/V amp 302, a variable-gain amp 303, a low-pass filter 304, an A/D converter 305, and a CPU 306.

Hereinbelow, the operation of this optical power meter will be explained. First, when light is inputted to this optical power meter, the photodiode 301 outputs a current which is proportional to the power of the input beam. The I/V amp 302 converts the current from the photodiode 301 into a proportional voltage and amplifies this by the gain. The variable-gain amp 303 amplifies the output voltage of the I/V amp 302 by the gain.

The low-pass filter 304 removes noise voltage contained in the output voltage from the variable-gain amp 303. The A/D converter 305 converts the output voltage of the low-pass filter 304 into a digital signal. The CPU 306 receives the output data from the A/D converter 305. In this case, the CPU 306 monitors whether or not the magnitude of the output data from the A/D converter 305 is within the range specified by a pre-determined upper and lower limit. If the output data from the A/D converter 305 exceeds this upper limit, the CPU 306 changes the gain of the I/V amp 302 or the variable-gain amp 303 to, for example, 1/10 the gain of the current setting. Then, this operation is repeated until the output data from the A/D converter 305 is contained within the range of the upper and lower limits.

FIG. 6 is a flow chart showing an example of the power range switchover control procedure performed by the CPU 306. The CPU 306 controls the power range switchover by performing the routine shown in the flow chart in a constant periodic cycle. First, when the routine is initiated and advanced to step 401, the CPU 306 reads in the output data from the A/D converter 305. Advancing next to step 402, the CPU 306 determines whether or not the data read in step 401 is within the range specified by the pre-determined upper and lower limits. If the result is "YES", then there is no need to switch over the power range, so the routine is terminated.

On the other hand, if the result in step 402 is "NO", the routine advances to step 403, and the gains of the I/V amp 302 and the variable-gain amp 303 are changed. In this case, if the output data from the A/D converter 305 in step 402 is less than the lower limit of the set range, the combined gain of the I/V amp 302 and the variable-gain amp 303 is changed to, for example, 10 times the current setting.

On the other hand, if the output data from the A/D converter 305 in step 402 exceeds the upper limit of the set range, the combined gain of the I/V amp 302 and the variable-gain amp 303 is changed to, for example, 1/10 the current setting. After this change, the routine returns to step 401, and the determination made in step 402 is repeated for new output data from the A/D converter 305. If the result is "NO", then the gain of the I/V amp 302 and the variable-gain amp 303 is changed again (step 403). In this way, the gain is repeatedly changed until the output data from the A/D converter 305 is contained within the pre-determined range.

FIG. 7 shows an example of the waveform of an A/D converter 305 during power range switchover as explained above. In this example, the case is shown wherein light L1 of from −100 dBm to −10 dBm is incident on the photodiode 301, and the power range is switched over ten times. After the light L1 is inputted, about 0.4 seconds pass before the input signal C1 of the A/D converter 305 becomes stable. After this delay of approximately 0.4 seconds, the input signal C1 of the A/D converter 305 exceeds the pre-determined upper limit, and the gain of the power range is reset one stage lower. Then, after a wait of 0.4 seconds, this operation is again repeated until the input signal C1 of the A/D converter 305 is contained within the range of the pre-determined upper and lower limits. In the example of FIG. 7, there are 10 power range switchovers, so a power range switchover time of approximately 4.4 seconds (0.4 seconds×11) is required.

In conventional optical power meters of this type, the power range is switched over to a suitable range by means of repeating the procedure of changing the gain of the I/V amp and the like to 10 times or 1/10 when the input voltage to the A/D converter is not within the allowable range. However, since the effect of a single switchover takes time to appear as a change in the output data of the A/D converter, there is a problem in that the required time becomes extremely long in cases wherein there are multiple range switchovers.

In this case, while the cutoff frequency of the low-pass filter must be made high to increase the response of the analog signal processing system from the I/V amp to the A/D converter in order to increase the response of the output data from the A/D converter with respect to the range switchover, when the cutoff frequency of the low-pass filter is increased in this way, the stability of the data converted by the A/D converter is disrupted. On the other hand, if the stability of the data converted by the A/D converter is to be maintained, more time is required for power range switchover due to a slowing of the response rate of the analog signal.

SUMMARY OF THE INVENTION

The present invention has been made in consideration of the above-described factors, and has the object of offering an optical power meter which can perform optical power measurements over a wide range of optical powers in a short period of time by making it possible to perform the power range switchover operation of the optical power meter in a short period of time.

In order to solve the above-described problems, the present invention offers an optical power meter comprising a photodiode for outputting an electrical current proportional to the optical power of an input optical beam; an I/V amp for converting the output electrical current from the photodiode into a voltage; a variable-gain amp for amplifying the output voltage of the I/V amp; an A/D converter for converting the output voltage of the variable-gain amp into a digital signal; a CPU for processing the digital signal outputted from the A/D converter; a first saturation detecting comparator for detecting saturation of an output voltage level of the I/V amp; and a second saturation detecting comparator for detecting saturation of an output voltage level of the variable-gain amp; wherein the CPU switches the gains of the I/V amp and the variable-gain amp based on output signals from the first saturation detecting comparator and the second saturation detecting comparator.

With the optical power meter according to the present invention, excessive gains are reduced simply upon detection of saturation of the I/V amp and the variable-gain amp respectively; consequently, the power range switchover time can be shortened.

Additionally, since the noise contained in the measurement signal can be removed by means of the low-pass filter in front of the A/D converter and a high-range cutoff frequency can be selected therefor, the power range switchover time can be shortened without disrupting the stability of the measurement value.

BRIEF EXPLANATION OF THE DRAWINGS

FIG. 7 is a waveform diagram showing the input signal to the A/D converter for a conventional optical power meter.

PREFERRED EMBODIMENTS OF THE INVENTION

Figure 1:
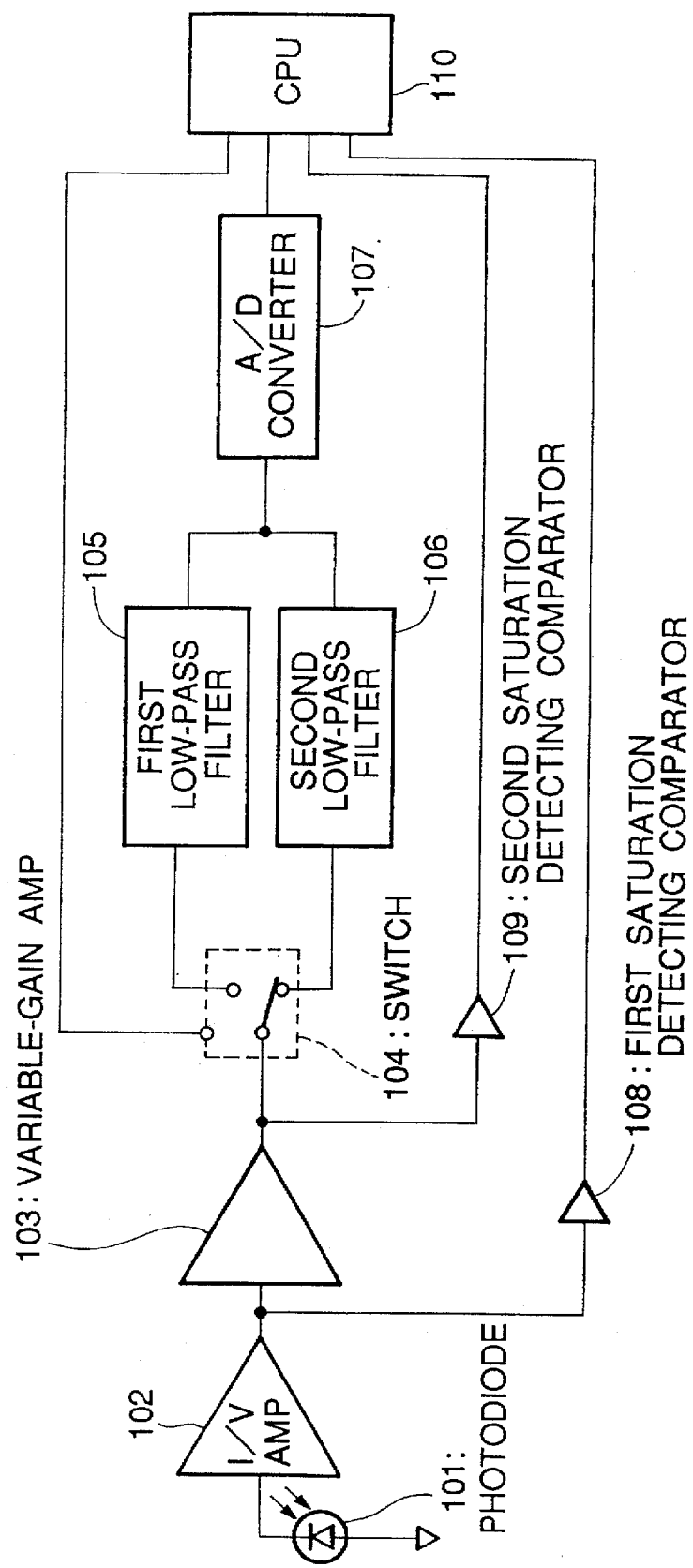
FIG. 1 is a block diagram showing the structure of an optical power meter according to an embodiment of the present invention.

Hereinbelow, embodiments of the present invention will be explained with reference to the drawings. FIG. 1 is a block diagram showing the structure of an optical power meter according to an embodiment of the present invention.

The optical power meter according to an embodiment of the present invention as shown in the drawings comprises a photodiode 101, an I/V amp 102, a variable-gain amp 103, a switch 104, a first low-pass filter 105, a second low-pass filter 106, an A/D converter 107, a first saturation detecting comparator 108, a second saturation detecting comparator 109, and a CPU 110.

Figure 2:
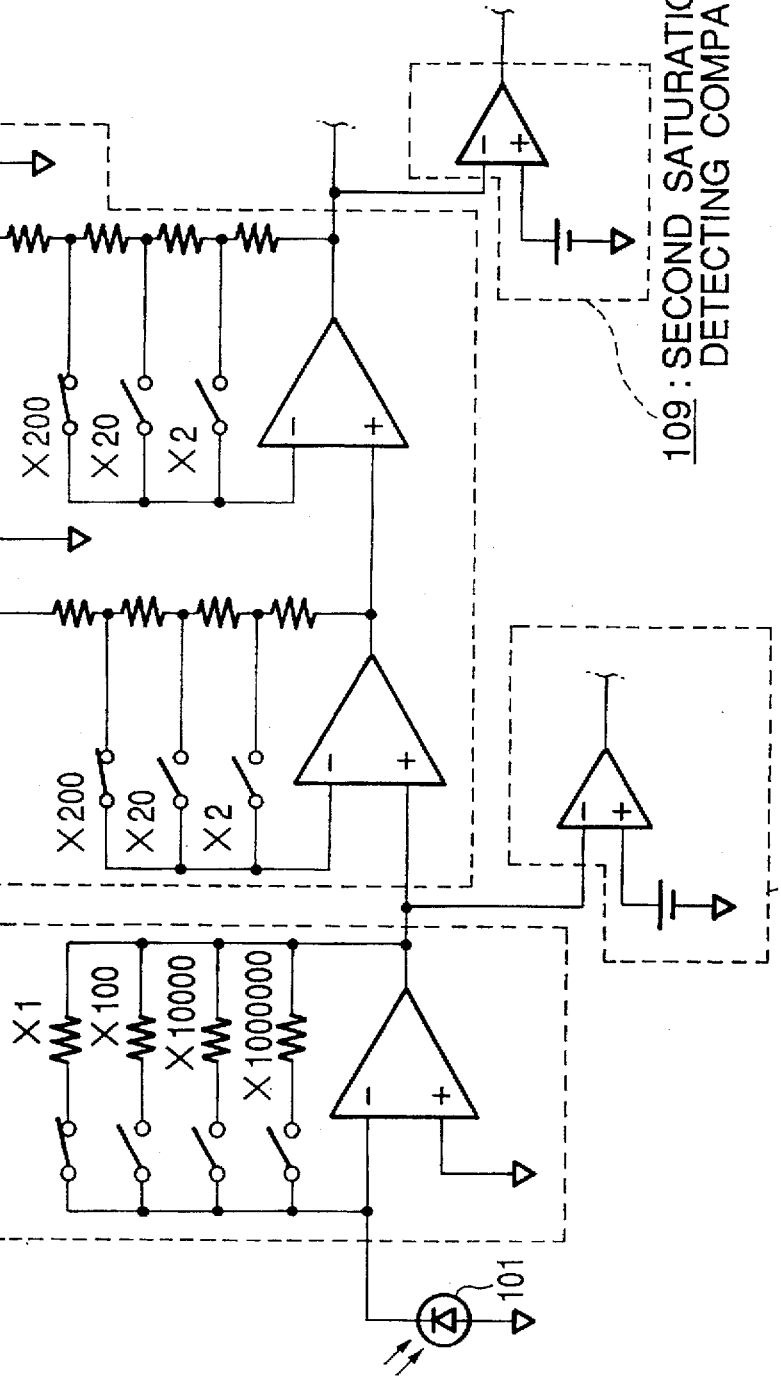
FIG. 2 is a circuit diagram showing the detailed structure of each portion of the same embodiment.

The first saturation detecting comparator 108 and second saturation detecting comparator 109 respectively compare the output voltage levels of the I/V amp 102 and the variable-gain amp 103 with a pre-determined reference level, and output detection signals when the output voltage levels are higher than the reference level. In this case, each reference level is set to a level slightly less than the saturation values for the output voltage levels of the I/V amp 102 and the variable-gain amp 103. Therefore, a detection signal is outputted from the I/V amp 102 or the variable-gain amp 103 when the output voltage level of the I/V amp 102 or the variable-gain amp 103 reaches the saturation value. FIG. 2 shows specific examples of the I/V amp 102, the variable-gain amp 103, and the saturation detecting comparators 108 and 109 according to the present embodiment. In FIG. 2, the gain switchover step for the I/V amp is set to 100 times, while the gain switchover step in the variable-gain amp is set to 10 times.

Next, the operations of this optical power meter will be explained with reference to FIG. 1, taking as an example the case wherein light is abruptly inputted into the photodiode 101 from a state wherein light is not inputted. First, when light is inputted into the optical power meter, an electrical current proportional to the input optical power flows in the photodiode 101. The I/V amp 102 converts the current flowing in this photodiode 101 into a proportional voltage, and amplifies this by the gain. At this time, if the I/V amp 102 is saturated, the first saturation detecting comparator 108 outputs a detection signal. When the CPU 110 receives a detection signal from the first saturation detecting comparator 108, the gain of the I/V amp 102 is reset to, for example, 1/100 the gain of the current setting. Then, this operation is repeated until the detection signal is no longer detected by the first saturation detecting comparator 108.

When detection signals are no longer detected from the first saturation detecting comparator 108, the CPU 110 detects saturation of the variable-gain amp 103 by monitoring the detection signals obtained from the second saturation detecting comparator 109. If the CPU 110 receives a detection signal from the second saturation detecting comparator 109, the gain of the variable-gain amp 103 is reset to, for example, 1/10 the gain of the current setting. This operation is repeated until detection signals are no longer outputted from the second saturation detecting comparator 109.

With the operations to this point, an extremely high-speed power range switchover is possible because the speed of the power range switchover is determined only by the amp response rate and the CPU processing rate.

Then, when detection signals are no longer outputted from the first saturation detecting comparator 108 and the second saturation detecting comparator 109, in most cases the adjustment to a suitable power range is complete. However, considering that the power range could be set to a gain of 1/10 or 10 times the appropriate power range under the influence of noise when determining the power range at high-speed, the switch 104 is used to switch over to the first low-pass filter 105. This first low-pass filter 105 has a higher cutoff frequency than the second low-pass filter 106, and the delay time of the analog signal is controlled to a minimum. In the present embodiment, the cutoff frequency of the first low-pass filter 105 is set to 100 times the frequency of the second low-pass filter, so that the cutoff frequency of the first low-pass frequency is approximately 150 Hz.

The A/D converter 107 converts the output voltage from the first low-pass filter 105 into a digital signal. The CPU 110 determines whether the output data from the A/D converter 107 is within the range of the pre-determined upper and lower limits. When it is within the pre-determined range, the switch 104 is used to switch over to the second low-pass filter 106. By passing through the second low-pass filter 106, a stable signal with less noise components is inputted into the A/D converter. The A/D converter 107 converts the output voltage from the second low-pass filter 106 into a digital signal. The CPU 110 confirms that the output data from the A/D converter 107 is within the range of the pre-determined upper and lower limits, and the power range switchover operation is terminated.

Figure 3:
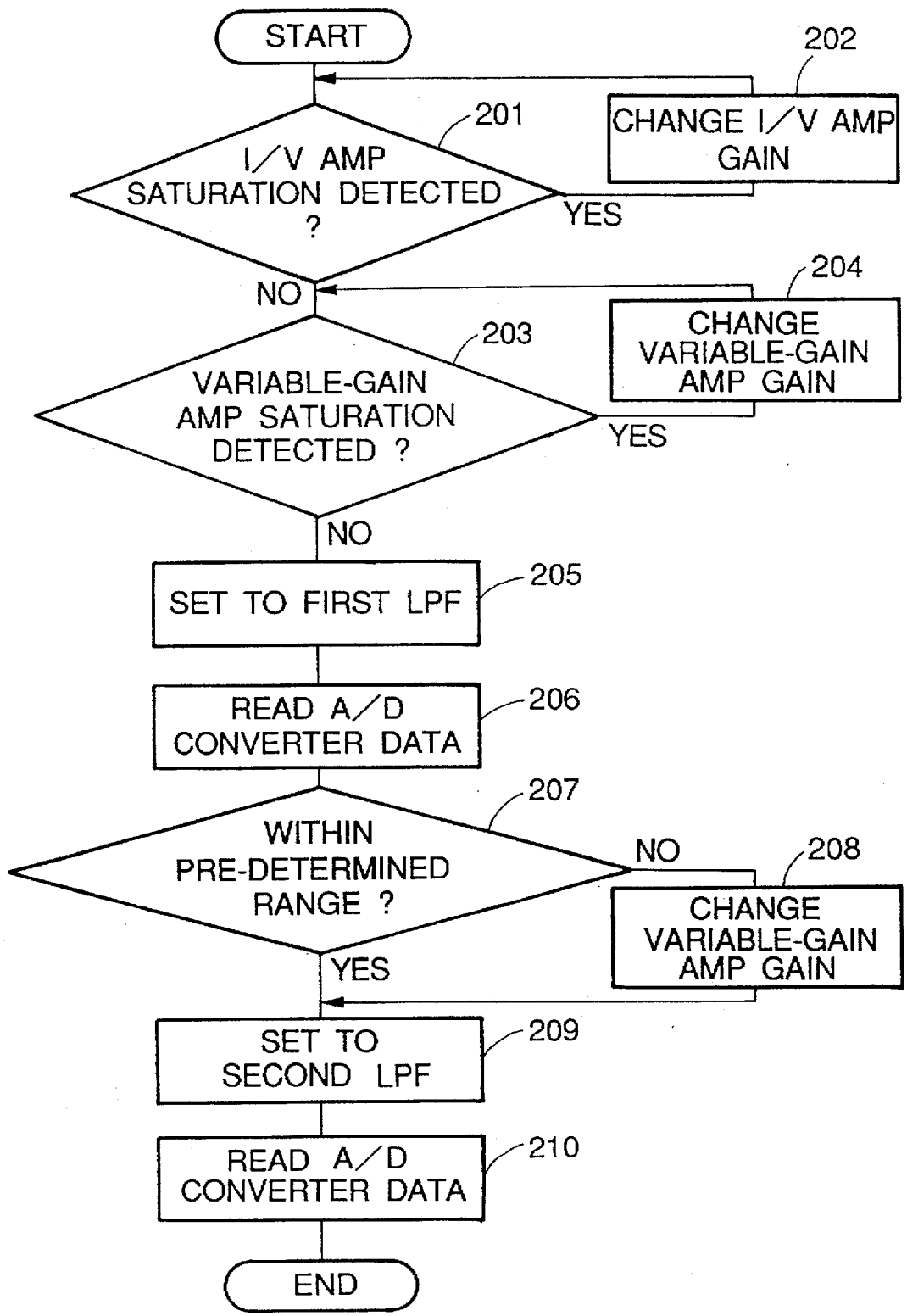
FIG. 3 is a flow chart showing the power range switchover operation of the same embodiment.

FIG. 3 gives an example of the control flow process of the CPU 110 for controlling the above-mentioned range switchover. First, in step 201, the CPU 110 determines whether or not the I/V amp 102 is saturated. If the result is "YES", then the routine advances to step 202 and an operation is performed to change the gain of the I/V amp 102 from the gain when saturation of the I/V amp was detected in step 201. The gain at this time is changed to, for example, 1/100 the gain of the current setting. After the gain has been changed, the routine returns to step 201 to detect saturation of the I/V amp 102, and this operation is repeated until saturation is no longer detected.

Advancing next to step 203, it is determined whether or not the variable-gain amp 103 is saturated. If the result is "YES", then the routine advances to step 204, and the gain of the variable-gain amp 103 is changed to, for example, 1/10 the gain of the current setting. After the gain has been changed, the routine returns to step 203 to detect saturation of the variable-gain amp 103, and the operation is repeated until saturation is no longer detected.

Advancing next to step 205, the switch 104 is used to select the first low-pass filter 105. This first low-pass filter is set for the analog signal delay time to be minimum as mentioned above. Advancing further to step 206, the data from the A/D converter 107 is read. Subsequently advancing to step 207, it is determined whether the output data from the A/D converter 107 read in step 206 is within the range of the pre-determined upper and lower limits.

If the result is "NO", then the routine advances to step 208, and the operation of changing the gain of the variable-gain amp is performed when the output data of the A/D converter is outside of the pre-determined range in step 207. At this time, if it is greater than the upper limit of the pre-determined range, the gain of the variable-gain amp is changed to, for example, 1/10 the gain of the current setting. On the other hand, if it is less than the lower limit of the pre-determined range, the gain of the variable-gain amp is changed to, for example, 10 times the gain of the current setting.

Advancing next to step 209, the switch 104 is used to select the second low-pass filter. Advancing further to step 210, the data is read from the A/D converter. By repeatedly performing the above-explained routine periodically, the CPU 110 continually makes adjustments to maintain the optimum power range.

Figure 4:
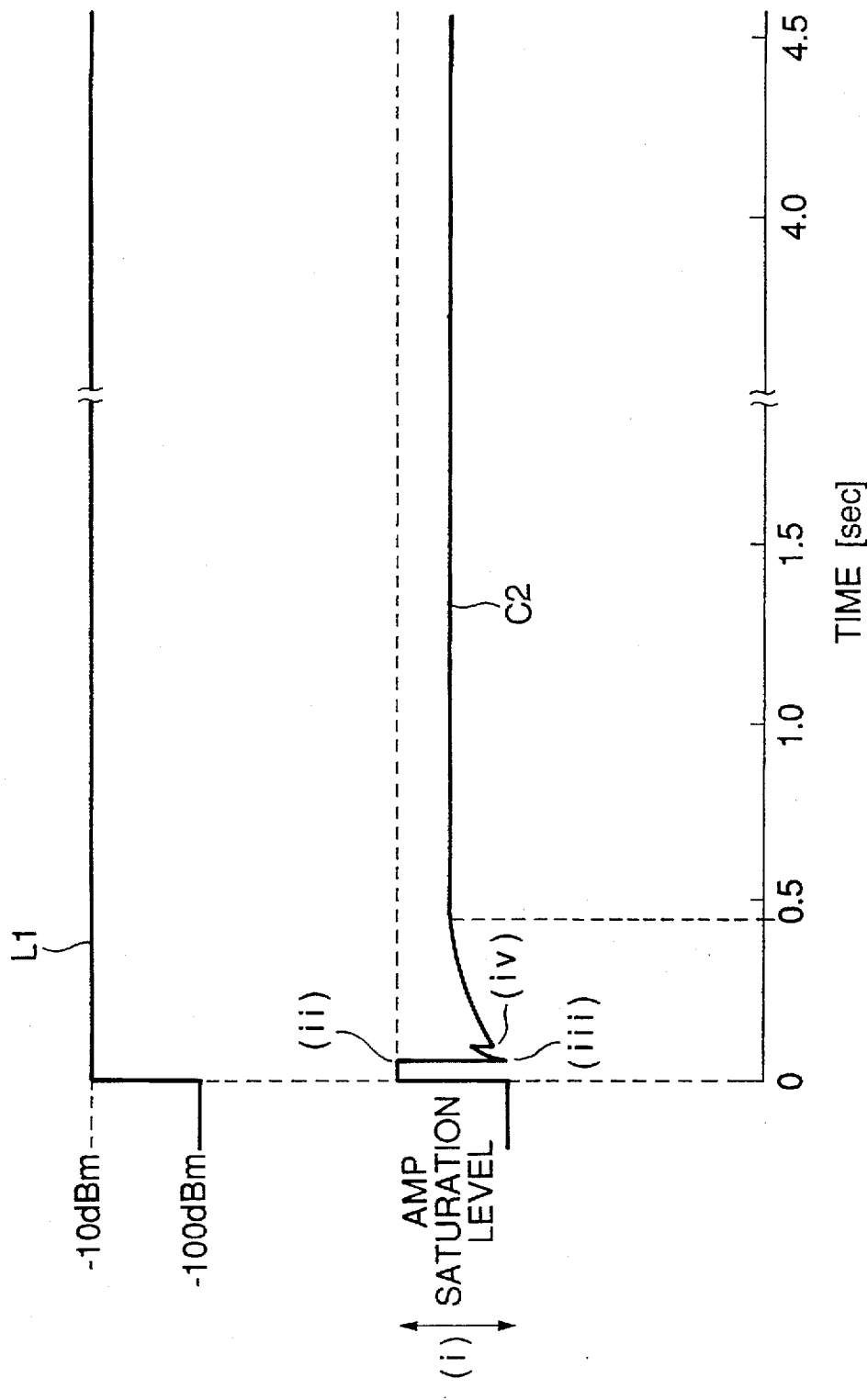
FIG. 4 is a waveform diagram showing the input signal to the A/D converter according to an embodiment of the present invention.
Figure 5:
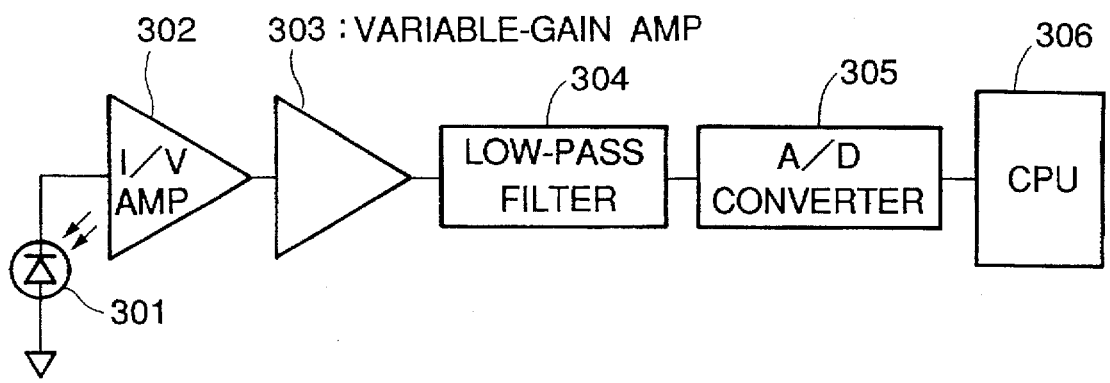
FIG. 5 is a block diagram showing the structure of a conventional optical power meter.
Figure 6:
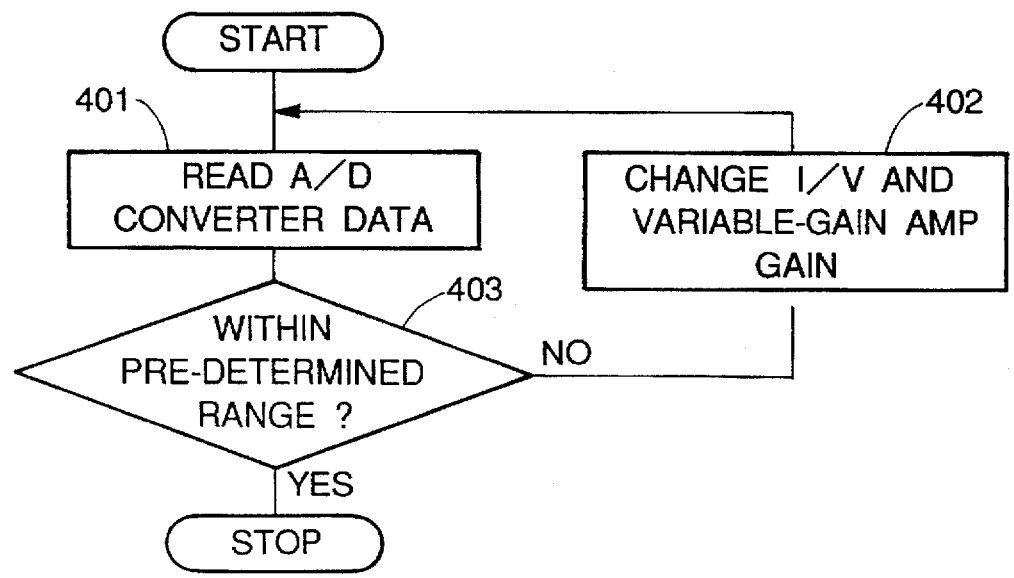
FIG. 6 is a flow chart showing the power range switchover operations of a conventional optical power meter.

FIG. 4 shows the waveform of the input voltage to the A/D converter 107 during the power range switchover explained above. In this example, the waveform of the input voltage to the A/D converter is shown for the case wherein the beam L1 shown in FIG. 4 is inputted. (i) indicates the allowable range for the input voltage of the A/D converter. (ii) indicates the operations for adjusting the power range with saturation detection of the I/V amp 102 and the variable-gain amp 103. (iii) indicates the operations for adjusting the first low-pass filter. (iv) indicates the operations for adjusting the second low-pass filter.

When an extremely high-powered optical beam L1 is inputted as shown in FIG. 4, the I/V amp 102 and the variable-gain amp 103 become saturated so that the gains of the respective amps are reduced to power ranges wherein saturation is eliminated. Since this amp gain adjustment is performed based not on output data from the A/D converter 107 but on detection signals from the saturation detecting comparators 108 and 109, it is completed extremely quickly. With the example shown in the drawing, the power range adjustment operation is completed in approximately 0.05 seconds. Then, after the power range has been adjusted, the setting to the first low-pass filter 105 is performed. After a waiting period of approximately 0.005 seconds, a determination is made as to whether the input voltage of the A/D converter 107 is within the allowable range. Thereafter, in the example shown in the drawings, since the input voltage to the A/D converter 107 is within the allowable range, the switch is made to the second low-pass filter 106 with the power range adjustment left as is. After a waiting time of approximately 0.4 seconds, the data from the A/D converter 107 is read, and the power range switchover operation is terminated. In this example, the power range switchover time is approximately 0.45 seconds.

I claim:

1. An optical power meter, comprising:

a photodiode for outputting an electrical current proportional to the optical power of an input optical beam;

an I/V amp for converting the output electrical current from said photodiode into a voltage;

a variable-gain amp for amplifying the output voltage of said I/V amp;

an A/D converter for converting the output voltage of said variable-gain amp into a digital signal;

a CPU for processing the digital signal outputted from said A/D converter;

a first saturation detecting comparator for detecting saturation of an output voltage level of said I/V amp; and a second saturation detecting comparator for detecting saturation of an output voltage level of said variable-gain amp;

wherein
   said CPU switches the gains of said I/V amp and said variable-gain amp based on output signals from said first saturation detecting comparator and said second saturation detecting comparator.

2. An optical power meter in accordance with claim 1, further comprising a plurality of low-pass filters with different high-range cutoff frequencies inserted in parallel in front of said A/D converter; and a switch which selectively connects said plurality of low-pass filters to said A/D converter under control of said CPU.

3. An optical power meter in accordance with claim 2, wherein said CPU selects from among said plurality of low-pass filters by controlling said switch after switching over the gains of said I/V amp and said variable-gain amp.

* * * * *